United States Patent
Sharma

(10) Patent No.: US 11,916,486 B2
(45) Date of Patent: Feb. 27, 2024

(54) TYPE-2 COMPENSATION WITH REDUCED QUIESCENT CURRENT

(71) Applicant: Texas Instruments Incorporated, Dallas, TX (US)

(72) Inventor: Anmol Sharma, Milpitas, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 166 days.

(21) Appl. No.: 17/460,804

(22) Filed: Aug. 30, 2021

(65) Prior Publication Data

US 2023/0060992 A1    Mar. 2, 2023

(51) Int. Cl.
    *H02M 3/335*     (2006.01)
    *H02M 1/00*      (2006.01)
    *H02M 1/08*      (2006.01)

(52) U.S. Cl.
    CPC ..... *H02M 3/33507* (2013.01); *H02M 1/0009* (2021.05); *H02M 1/08* (2013.01)

(58) Field of Classification Search
    CPC .. H02M 3/33507; H02M 1/0009; H02M 1/08; H02M 3/156; H02M 1/0003
    See application file for complete search history.

(56) References Cited

U.S. PATENT DOCUMENTS 10,256,723 B1 * 4/2019 Vaccalluzzo .......... H02M 3/156
11,695,377 B2 * 7/2023 van Veldhoven ....... H03F 3/387
                                                                                     330/291
2008/0218145 A1    9/2008   Xu
2009/0206815 A1    8/2009   Yen
2011/0156688 A1    6/2011   Lin et al.
2013/0154595 A1 * 6/2013   Drinovsky ............ H02M 3/156
                                                                                     323/282
2015/0155783 A1    6/2015   Li et al.

FOREIGN PATENT DOCUMENTS

CN          111490679 A      8/2020

OTHER PUBLICATIONS

Notification of Transmittal of the International Search Report and the Written Opinion of the International Searching Authority, or the Declaration; PCT/US2022/041837; dated Dec. 21, 2022; 8 pages.

* cited by examiner

*Primary Examiner* — Kyle J Moody
(74) *Attorney, Agent, or Firm* — Ray A. King; Frank D. Cimino

(57) ABSTRACT

A compensation circuit includes a tail current source, an error amplifier; a compensation resistor, and a voltage-to-current converter circuit. The tail current source is configured to generate a tail current. The error amplifier is coupled to the tail current source and biased by the tail current. The compensation resistor is coupled to the error amplifier. The voltage-to-current converter circuit is coupled to the error amplifier. The compensation resistor is configured to vary in resistance responsive to a change in the tail current, or the voltage-to-current converter circuit is configured to vary in transconductance responsive to the change in the tail current.

20 Claims, 4 Drawing Sheets

TYPE-2 COMPENSATION WITH REDUCED QUIESCENT CURRENT

BACKGROUND

A switch-mode power supply is an electronic circuit that converts an input direct current (DC) supply voltage into one or more DC output voltages that are higher or lower in magnitude than the input DC supply voltage. A switch-mode power supply that generates an output voltage lower than the input voltage is termed a buck or step-down converter. A switch-mode power supply that generates an output voltage higher than the input voltage is termed a boost or step-up converter. The stability of the switch-mode power supply may be compromised by gain and phase-shift introduced in the control loop of the power supply. Compensation may be applied in a switch-mode power supply to counteract the gain and phase shift.

SUMMARY

Type-2 compensations circuits that allow for reduced quiescent current while maintaining unity gain bandwidth are described herein. In one example, a compensation circuit includes a tail current source, an error amplifier, a variable compensation resistor, and a voltage-to-current converter circuit. The error amplifier is coupled to the tail current source, and includes an input and an output. The variable compensation resistor is coupled to the tail current source and the output of the error amplifier. The voltage-to-current converter circuit includes an input coupled to the output of the error amplifier, and an output coupled to the input of the error amplifier.

In another example, a compensation circuit includes a tail current source, an error amplifier, and voltage-to-current converter. The error amplifier is coupled to the tail current source, and includes an input and an output. The voltage-to-current converter circuit includes a first input coupled to the output of the error amplifier, a second input coupled to the tail current source, and an output coupled to the input of the error amplifier.

In a further example, a compensation circuit includes a tail current source, an error amplifier; a compensation resistor, and a voltage-to-current converter circuit. The tail current source is configured to generate a tail current. The error amplifier is coupled to the tail current source and biased by the tail current. The compensation resistor is coupled to the error amplifier. The voltage-to-current converter circuit is coupled to the error amplifier. The compensation resistor is configured to vary in resistance responsive to a change in the tail current, or the voltage-to-current converter circuit is configured to vary in transconductance responsive to the change in the tail current.

In a yet further example, a switch-mode power supply includes an output terminal, a voltage divider, a tail current source, an error amplifier, a compensation network, and voltage-to-current converter circuit. The voltage divider is coupled to the output terminal. The tail current source is configured to generate a tail current. The error amplifier is coupled to the voltage divider and the tail current source. The compensation network is coupled to the error amplifier. The voltage-to-current converter circuit is coupled to the error amplifier and the output terminal. The compensation network is configured to vary in resistance responsive to a change in the tail current, or the voltage-to-current converter circuit is configured to vary in transconductance responsive to the change in the tail current.

DETAILED DESCRIPTION

Compensation circuits are employed to stabilize the control loop in switch-mode power supply circuits and other feedback loop-controlled circuits. The type (e.g., type-1, type-2, or type-3) of compensation circuit employed is selected based on various parameters (e.g., output filter component type and size, switching frequency, bandwidth, etc.) of the circuit being controlled. Type-2 compensation is widely used in DC-DC switch mode power supply circuits and other circuits. For example, type-2 compensation may be used in applications where the frequency of the zero caused by the circuit output capacitor and its equivalent series resistance is smaller than the closed loop bandwidth of the control loop.

The control loop used in a switch-mode power supply includes an error amplifier that generates an error signal representative of the difference in power supply output voltage and a reference voltage. The error amplifier is a key contributor to the quiescent current consumption of the circuit. For example, while some switch-mode power supply circuits implement a low-power mode (such as clock skipping) for use in light load situations, the error amplifier remains active in the low-power mode, which limits quiescent current reduction. Various techniques for reducing quiescent current (e.g., reducing error amplifier tail current) based on load or dynamic bias are not applicable to circuits using type-2 compensation because changing tail current also changes the unity gain bandwidth of the circuit, which changes system dynamics and stability.

The type-2 compensation circuits described herein reduce the quiescent current of the error amplifier without changing the dynamic characteristics of the circuit. The compensation circuits make unity gain bandwidth independent of tail current, which allows the tail current to be reduced in light load situations to reduce circuit quiescent current consumption.

Figure 1:
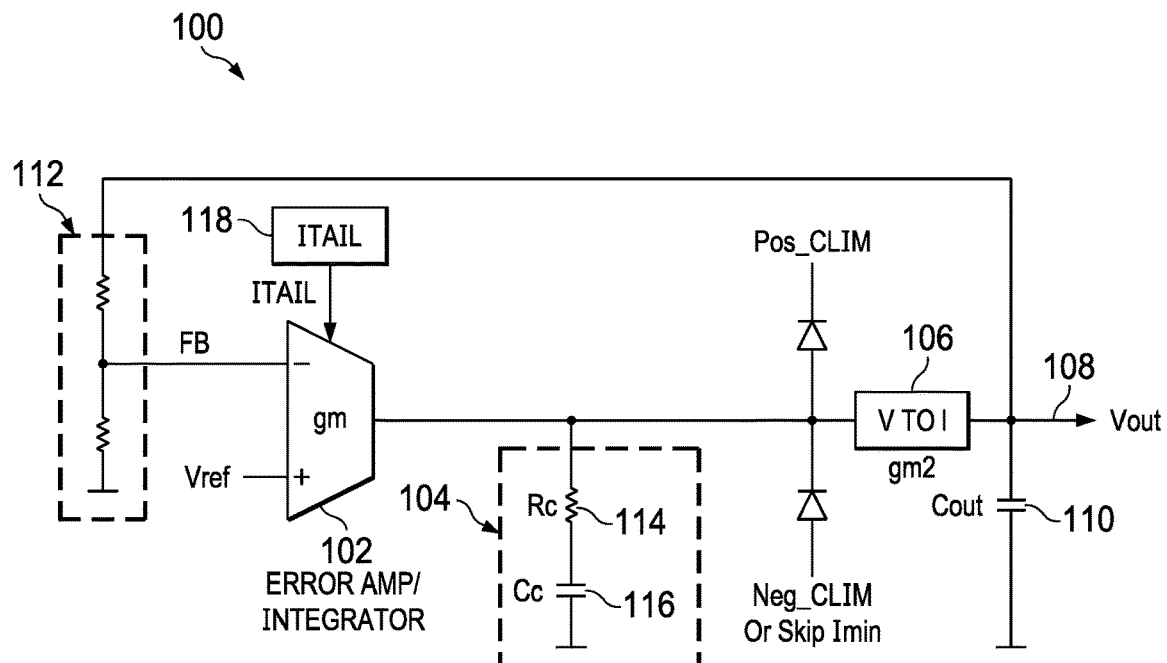
FIG. 1 is a block diagram for an example circuit that includes type-2 compensation with reduced quiescent current as described herein.

FIG. 1 is a block diagram for an example circuit 100 that includes type-2 compensation with reduced quiescent current as described herein. The circuit 100 may be included in a switch-mode power supply (e.g., a buck converter, a boost converter, etc.). The circuit 100 includes an error amplifier 102, a compensation network 104, a voltage-to-current converter circuit 106, an output terminal 108, an output capacitor 110, and a voltage divider 112. The output terminal 108 is coupled to the output capacitor 110 and the output of the voltage-to-current converter circuit 106. Current flows from the voltage-to-current converter circuit 106 to charge the output capacitor 110 and power circuitry external to the circuit 100. The voltage divider 112 is coupled to the output terminal 108 voltage (Vout). The voltage divider 112 divides Vout and provides the divided Vout to the error amplifier 102. A first input of the error amplifier 102 is coupled to the voltage divider 112, and a second input of the voltage divider 112 is coupled to a voltage reference. The error amplifier 102 compares the divided Vout received from the voltage divider 112 to a reference voltage received from the voltage reference to generate an error signal that is representative of the difference between the reference voltage and the divided output voltage. A third input of the error amplifier 102 is coupled to a tail current source 118 that generates a tail current for biasing the error amplifier 102. The output of the error amplifier 102 is coupled to the compensation network 104. The compensation network 104 includes a compensation resistor 114 and a compensation capacitor 116. The compensation resistor 114 is coupled to the compensation capacitor 116. The resistance (Rc) of the compensation resistor 114 is variable, rather than fixed.

The output of the error amplifier 102 is coupled to an input of the voltage-to-current converter circuit 106. The voltage-to-current converter circuit 106 generates an output current based on the error signal received from the error amplifier 102. The voltage-to-current converter circuit 106 may include various components to perform the voltage to current conversion. For example, the voltage-to-current converter circuit 106 may include an inductor, drive transistors coupled to the inductor, and a pulse generation circuit (e.g., a pulse width modulator) coupled to the drive transistors. The pulse generation circuit may generate pulses to activate the drive transistors based on the error signal generated by the error amplifier 102.

Unity gain bandwidth of the circuit 100 may be expressed as:

$$UGB = \frac{gm * gm2 * Rc * Vref}{Cout * Vout} \quad (1)$$

where:
gm is the transconductance of the error amplifier 102;
gm2 is the transconductance of the voltage-to-current converter circuit 106;
Rc is the resistance of the compensation resistor 114;
Vref is the reference voltage provided to the error amplifier 102; and
Cout is the capacitance of the compensation capacitor 116.

In the circuit 100, the tail current source 118 varies the current ITAIL provided to the error amplifier 102 based on the current flowing from the output of the voltage-to-current converter circuit 106 to the output terminal 108. In accordance with equation (1), to maintain unity gain bandwidth of the circuit 100 with varying ITAIL (and varying transconductance of the error amplifier 102), the circuit 100 changes the resistance (Rc) of the compensation resistor 114 or changes the transconductance (gm2) of the voltage-to-current converter circuit 106. For example, as ITAIL decreases (and the transconductance of the error amplifier 102 decreases responsive to ITAIL), the resistance of the compensation resistor 114 or the transconductance of the voltage-to-current converter circuit 106 increases to maintain the unity gain bandwidth of the circuit 100.

Figure 2:
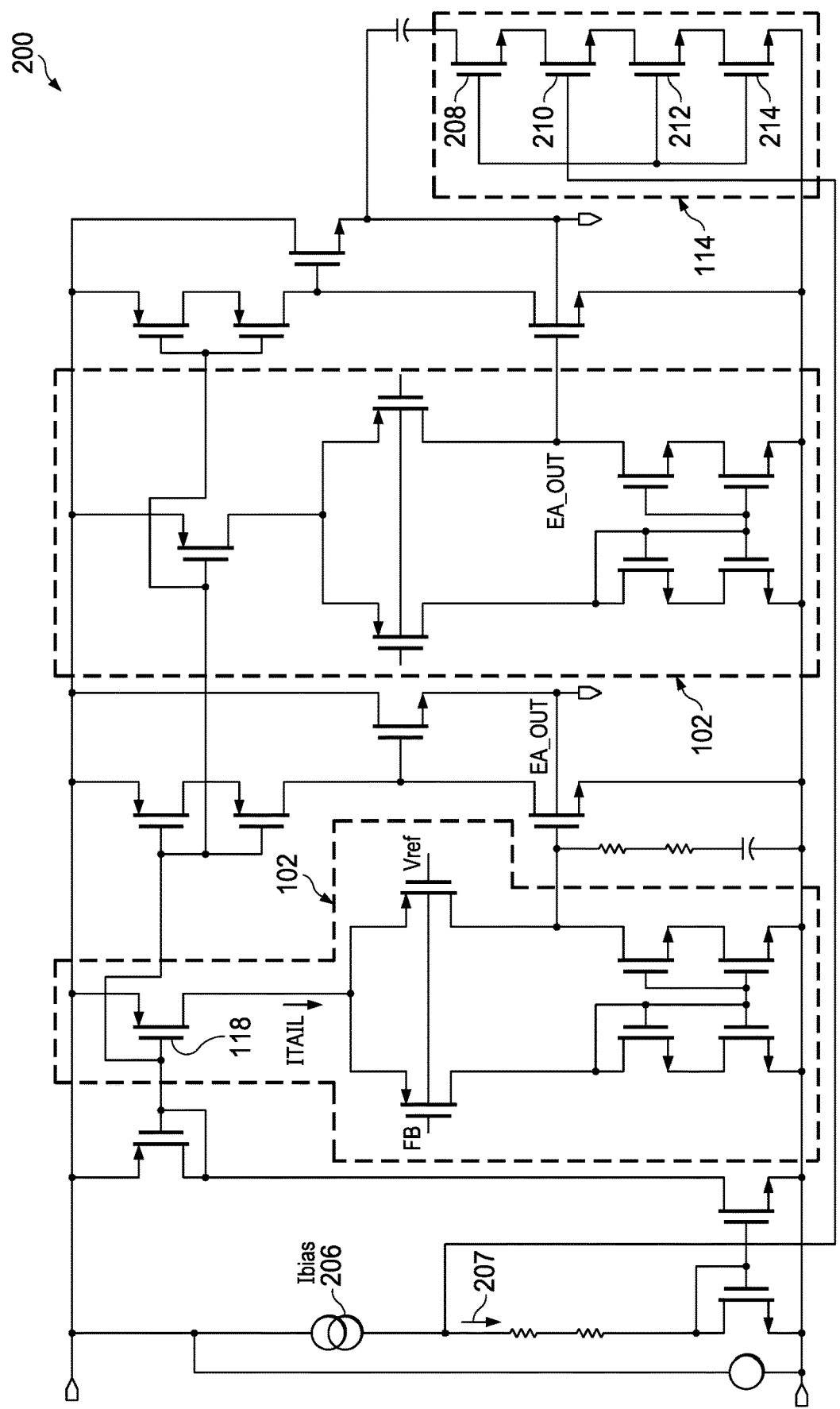
FIG. 2 is a schematic diagram for an example compensation resistor suitable for use in the circuit of FIG. 1.

FIG. 2 is a schematic diagram for an example compensation resistor 114 (a variable compensation resistor) suitable for use in maintaining unity gain bandwidth in the circuit 100. The compensation resistor 114 includes multiple transistors connected source to drain. In FIG. 2, the compensation resistor 114 is shown to include four transistors 208, 210, 212, and 214. Other implementations of the compensation resistor 114 may include a different number of transistors, or any other implementation of a resistor where resistor value (Rc) increases with decreasing current (ITAIL). The drain of the transistor 208 is coupled to the output of the error amplifier 102. The source of the transistor 208 is coupled to the drain of the transistor 210. The source of the transistor 210 is coupled to the drain of the transistor 212. The source of the transistor 212 is coupled to the drain of the transistor 214. The gates of the transistor 208, the transistor 210, the transistor 212, and the transistor 214 are coupled to the current source 206 that provides a bias current 207 corresponding to ITAIL.

The compensation resistor 114 is biased in the triode region while the circuit 100 is operating with a high output current. As current flow from the current source 206 is reduced to reduce quiescent current consumption, the bias voltage provided to the transistors 208-214 is reduced, and the resistance of the compensation resistor 114 increases. Thus, the compensation resistor 114 may be a variable resistor, the resistance of which increases as ITAIL decreases. Some implementations of the compensation resistor 114 may include circuitry different from that of FIG. 2 to vary compensation resistance based on quiescent current of the error amplifier 102.

Figure 3:
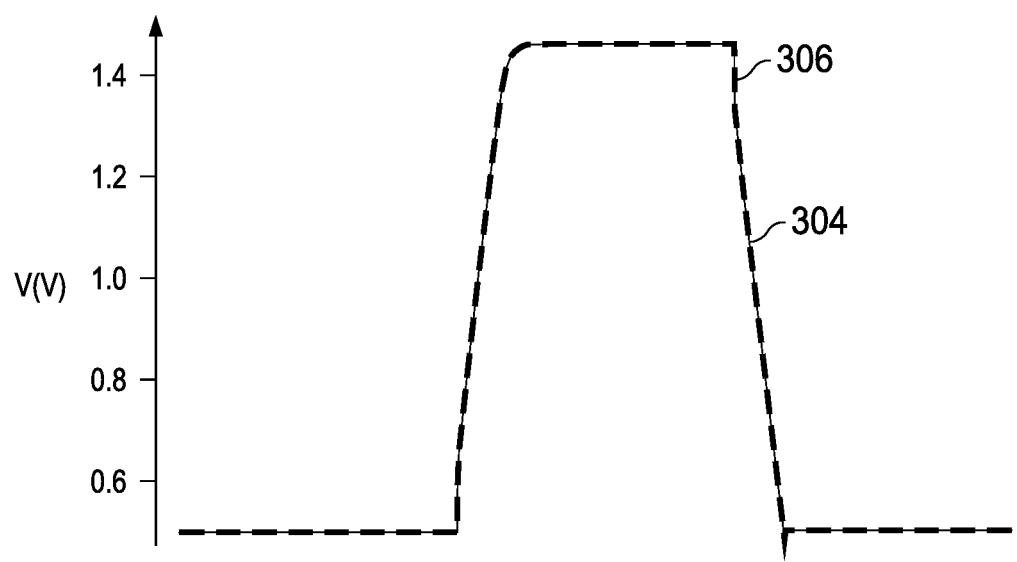
FIG. 3 is a graph of step response of an error amplifier with high quiescent current.
Figure 3:
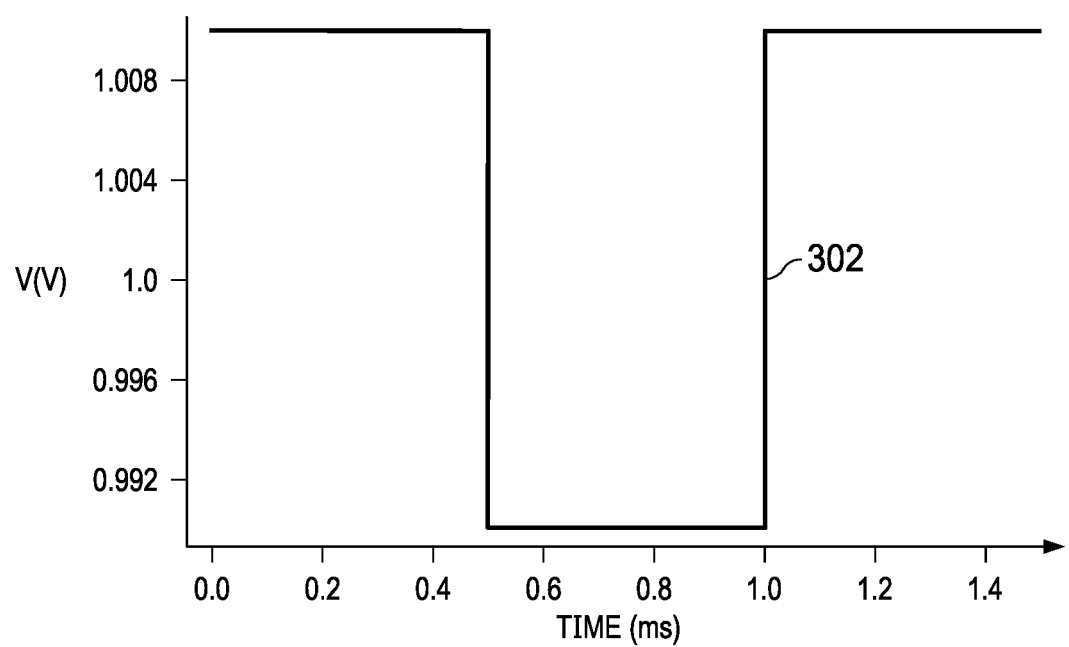

FIG. 3 is a graph of step response of the error amplifier 102 with high quiescent current. The illustrated response is indicative of desired unity gain band width of the circuit 100. The feedback signal 302 applied at the first input of the error amplifier 102 is illustrated as a step voltage falling below a 1-volt reference voltage. The error signal 304 is generated by the error amplifier 102 with compensation adaptation, and the error signal 306 is generated by an error amplifier without compensation adaptation. FIG. 3 shows that with high quiescent current, the bandwidth of the circuit 100 is about the same as the bandwidth of a circuit that includes type-2 compensation and no compensation adaptation.

Figure 4:
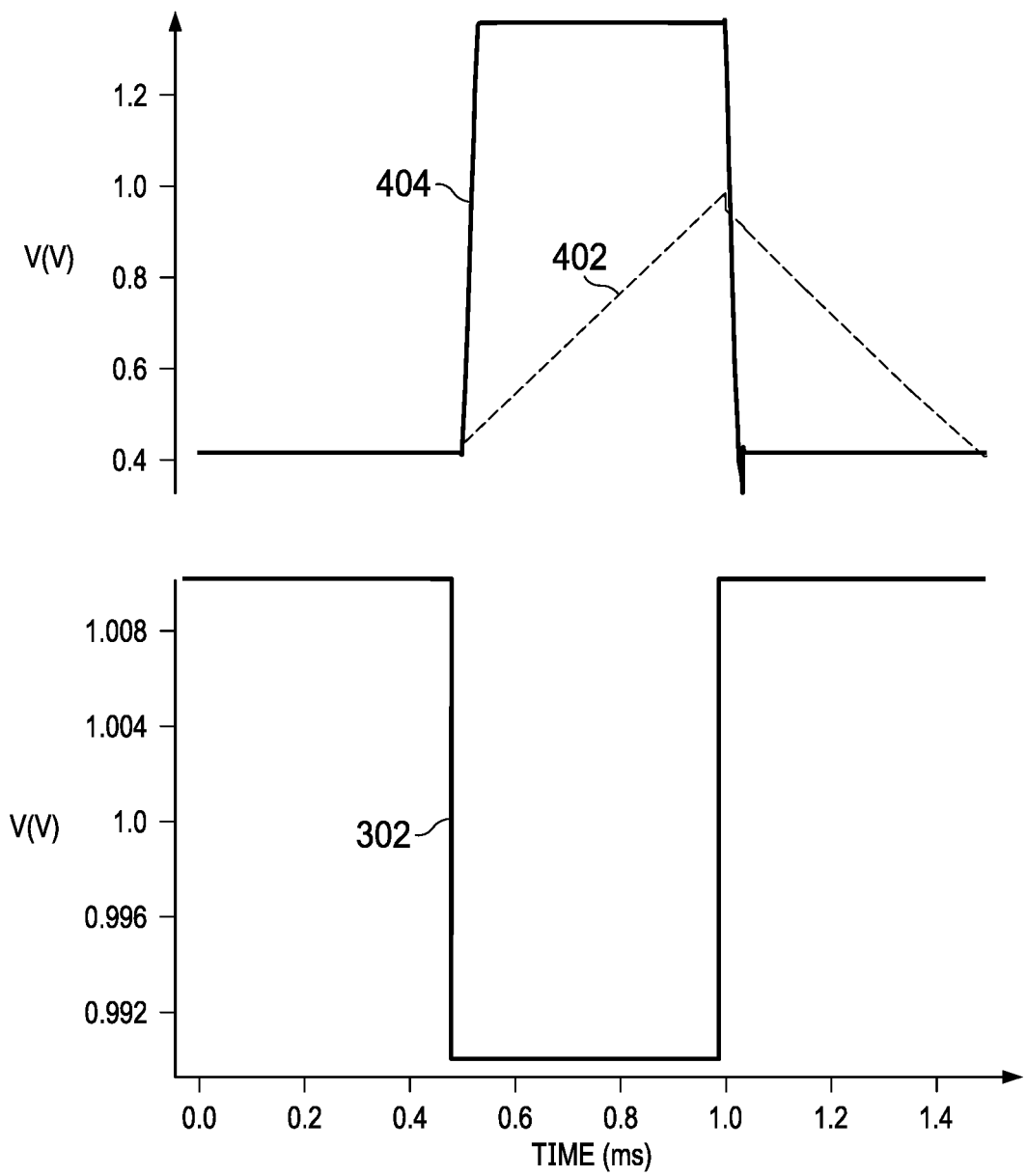
FIG. 4 is a graph of step response of an error amplifier with low quiescent current and compensation adaptation.

FIG. 4 is a graph of step response of an error amplifier 102 with low quiescent current (e.g., 1/10 the quiescent current as provided in FIG. 3). The error signal 402 shows response of an error amplifier with low quiescent current and no compensation adaptation for reduced quiescent current. The error signal 404 shows response of the error amplifier 102 with low quiescent current and compensation adaptation by increasing the resistance of the compensation resistor 114 based on the tail current provided to the error amplifier 102. The error signal 404 closely resembles the error signal 306 shown in FIG. 3, indicating that the bandwidth of the circuit 100 with low quiescent current is similar to the bandwidth of the circuit 100 with high quiescent current. FIG. 4 shows that without compensation adaptation the bandwidth of the error amplifier is reduced with low quiescent current (because response is slow and sluggish which is indicative of low bandwidth), while bandwidth of the error amplifier 102 is maintained when using the compensation adaptation described herein.

Figure 5:
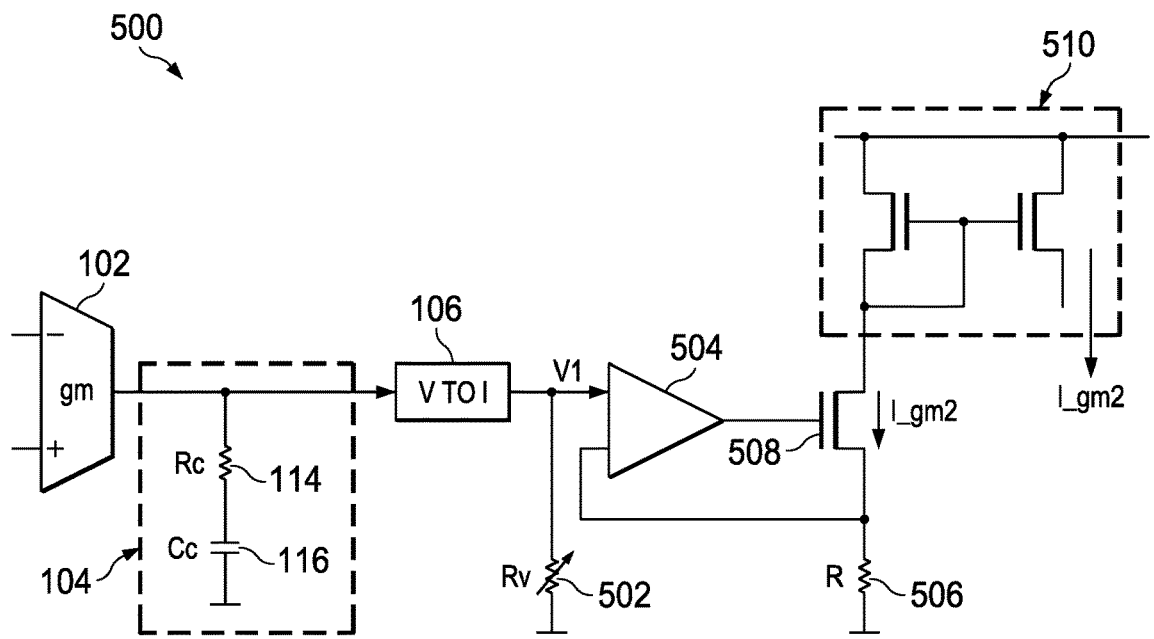
FIG. 5 is a block diagram for an example circuit that includes type-2 compensation with reduced quiescent current and compensation adaptation by varying transconductance.

FIG. 5 is a block diagram for an example circuit 500 that includes type-2 compensation with reduced quiescent current and compensation adaptation by varying transconductance. The circuit 500 includes the error amplifier 102, the compensation network 104, the voltage-to-current converter circuit 106, a variable resistor 502, an amplifier 504, a resistor 506, a transistor 508, and a current mirror circuit 510. The resistor 506 is a fixed resistor (a fixed value of resistance). The output of the voltage-to-current converter circuit 106 is coupled to the variable resistor 502 and to a first input of the amplifier 504. A second input of the amplifier 504 is coupled to the resistor 506 and a source of the transistor 508. The output of the amplifier 504 is coupled to the gate of the transistor 508. The drain of the transistor 508 is coupled to the current mirror circuit 510. The current mirror circuit 510 generates a current I_gm2 corresponding to the current flowing through the transistor 508. In a switching regulator, a current comparator (not shown) may compare I_gm2 to current flowing in an inductor (not shown) to control switching in the regulator.

In the circuit 500, the transconductance (gm2) is represented as:

$$gm2 = \frac{Rv}{R} \quad (2)$$

where:

Rv is the resistance of the variable resistor 502; and

R is the resistance of the resistor 506.

In the circuit 500, the resistance (Rv) of the variable resistor 502 increases as the quiescent current of the error amplifier 102 decreases (as ITAIL decreases). Increasing Rv increases the voltage (V1) at the input of the amplifier 504, increases I_gm2, and increases the transconductance gm2 as per equation (2). Thus, the transconductance gm2 increases as the quiescent current decreases, and unity gain bandwidth is maintained with change in quiescent current per equation (1). The variable resistor 502 may be implemented similar to the compensation resistor 114 as shown in FIG. 2.

Other implementations of the circuit 500 may include different circuitry to vary the transconductance gm2 based on the quiescent current of the error amplifier 102.

In this description, the term "couple" may cover connections, communications or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal generated by device A.

Modifications are possible in the described embodiments, and other embodiments are possible, within the scope of the claims.

What is claimed is:

1. A compensation circuit, comprising:

a current source;

an amplifier having an amplifier input, an offset input and an amplifier output, wherein the offset input is coupled to the current source;

a variable resistor coupled to the current source and the amplifier output; and a voltage-to-current converter having a converter input and a converter output, wherein the converter input is coupled to the amplifier output, and the converter output is coupled to the amplifier input.

2. The compensation circuit of claim 1, wherein:

the current source is configured to provide a current at a current source output; and the variable resistor is configured to increase in resistance responsive to a decrease in the current at the current source output, and decrease in resistance responsive to an increase in the current at the current source output.

3. The compensation circuit of claim 2, wherein the current source is configured to:

increase the current at the current source output responsive to an increase in current at the converter output; and decrease the current at the current source output responsive to a decrease in current at the converter output.

4. The compensation circuit of claim 2, wherein the amplifier has a unity gain bandwidth that is independent of the current provided at the current source output.

5. The compensation circuit of claim 1, wherein the variable resistor includes:

a first transistor coupled to the amplifier output, and having a first control terminal coupled to the current source; and a second transistor coupled between the first transistor and a ground terminal, and having a second control terminal coupled to the current source.

6. A compensation circuit, comprising:

a current source;

an amplifier having a first amplifier input, an offset input and a first amplifier output, wherein the offset input is coupled to the current source; and a voltage-to-current converter circuit having first and second converter inputs and a converter output, wherein the first converter input is coupled to the first amplifier output, the second converter input is coupled to the current source, and the converter output is coupled to the first amplifier input.

7. The compensation circuit of claim 6, wherein:

the current source is configured to provide a current at a current source output; and the voltage-to-current converter circuit is configured to increase in transconductance responsive to a decrease in the current at the current source output, and decrease in transconductance responsive to an increase in the current at the current source output.

8. The compensation circuit of claim 7, wherein the current source is configured to:

increase the current at the current source output responsive to an increase in current at the converter output; and decrease the current at the current source output responsive to a decrease in current at the converter output.

9. The compensation circuit of claim 7, wherein the voltage-to-current converter circuit includes a variable resistor coupled to the converter output, wherein the variable resistor is configured to increase in resistance responsive to a decrease in current at the current source output, and decrease in resistance responsive to a decrease in current at the current source output.

10. The compensation circuit of claim 9, further comprising:

a second amplifier having second and third amplifier inputs and a second amplifier output, wherein the second amplifier input is coupled to the converter output; and a fixed resistor coupled to the second amplifier output and the third amplifier input.

11. The compensation circuit of claim 10, wherein the transconductance is the resistance of the variable resistor divided by a resistance of the fixed resistor.

12. A compensation circuit, comprising:
a current source configured to provide a current at a current source output;
an amplifier coupled to the current source output and biased by the current provided at the current source output;
a resistor coupled to the amplifier, and configured to vary in resistance responsive to a change in the current at the current source output; and
a voltage-to-current converter circuit coupled to the amplifier, having a converter output, and configured to vary in transconductance responsive to a change in the current at the current source output.

13. The compensation circuit of claim 12, wherein the current source is configured to:
increase the current at the current source output responsive to an increase in current at the converter output; and
decrease the current at the current source output responsive to a decrease in current at the converter output.

14. The compensation circuit of claim 12, wherein the resistor is configured to increase in resistance responsive to a decrease in the current at the current source output, and increase in resistance responsive to a decrease in the current at the current source output.

15. The compensation circuit of claim 12, wherein the voltage-to-current converter circuit is configured to increase in transconductance responsive to a decrease in the current at the current source output, and decrease in transconductance responsive to an increase in the current at the current source output.

16. A switch-mode power supply, comprising:
a voltage divider coupled to an output terminal;
a current source configured to provide a current at a current source output;
an amplifier coupled to the voltage divider and the current source, and having an amplifier output;
a compensation network coupled to the amplifier, and configured to vary in resistance responsive to a change in the current at the current source output; and
a voltage-to-current converter circuit coupled to the amplifier and the output terminal, and configured to vary in transconductance responsive to a change in current at the current source output.

17. The switch-mode power supply of claim 16, wherein:
the compensation network includes a resistor coupled to a capacitor, wherein the resistor is configured to increase in resistance reponsive to a decrease in current at the current source output, and increase in resistance responsive to a decrease in current at the current source output.

18. The switch-mode power supply of claim 17, wherein the resistor includes:
a first transistor coupled to the amplifier output, and having a first control terminal coupled to the current source; and
a second transistor coupled between the first transistor and a ground terminal, and having a control terminal coupled to the current source.

19. The switch-mode power supply of claim 16, wherein the voltage-to-current converter circuit is configured to increase in transconductance responsive to a decrease in current at the current source output, and decrease in transconductance responsive to an increase in current at the current source output.

20. The switch-mode power supply of claim 17, wherein:
the voltage-to-current converter circuit includes a variable resistor coupled to an output of the voltage-to-current converter circuit; and
the resistor in the compensation network is configured to increase in resistance responsive to a decrease in current at the current source output, and decrease in resistance responsive to an increase in current at the current source output.

* * * * *